(12) United States Patent
Pandharipande et al.

(10) Patent No.: US 9,439,260 B2
(45) Date of Patent: Sep. 6, 2016

(54) CALIBRATING A LIGHT SENSOR

(71) Applicant: KONINKLIJKE PHILIPS N.V., Eindhoven (NL)

(72) Inventors: Ashish Vijay Pandharipande, Eindhoven (NL); David Ricardo Caicedo Fernandez, Eindhoven (NL); Michiel Adriannszoon Klompenhouwer, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/434,777

(22) PCT Filed: Sep. 12, 2013

(86) PCT No.: PCT/IB2013/058477
§ 371 (c)(1),
(2) Date: Apr. 10, 2015

(87) PCT Pub. No.: WO2014/057372
PCT Pub. Date: Apr. 17, 2014

(65) Prior Publication Data
US 2015/0271887 A1   Sep. 24, 2015

Related U.S. Application Data

(60) Provisional application No. 61/712,386, filed on Oct. 11, 2012.

(51) Int. Cl.
*H05B 37/02* (2006.01)
*H05B 33/08* (2006.01)
*G01J 1/44* (2006.01)

(52) U.S. Cl.
CPC ............. *H05B 33/0848* (2013.01); *G01J 1/44* (2013.01); *H05B 37/0218* (2013.01); *H05B 37/0227* (2013.01); *G01J 2001/444* (2013.01); *Y02B 20/46* (2013.01)

(58) Field of Classification Search
CPC .................... H05B 33/089; H05B 33/0851
USPC .................................................. 315/151, 294
See application file for complete search history.

(56) References Cited

U.S. PATENT DOCUMENTS 8,207,676 B2   6/2012   Hilgers
2004/0245946 A1*  12/2004   Halter ................. H01L 25/0753
                                                            315/312

(Continued)

FOREIGN PATENT DOCUMENTS

| WO | 2011033444 A1 | 3/2011 |
| WO | 2011039690 A1 | 4/2011 |
| WO | 2012104733 A2 | 8/2012 |

*Primary Examiner* — Don Le
(74) *Attorney, Agent, or Firm* — Meenakshy Chakravorty

(57) ABSTRACT

A method of calibrating an output of a light sensor for use in controlling a lighting system comprising at least one lighting device. The method comprises placing the lighting system into each of a plurality of discrete modes, each mode being configured to output a different respective configuration of light, wherein in operation each mode will automatically vary an output illumination level of the respective configuration based on the output of the light sensor in response to a changing light level in an environment being illuminated. The method further comprises performing a plurality of calibrations by determining a respective calibration setting for calibrating the output of the light sensor in each of the modes, and setting each mode to vary the output illumination level based on the output of the light sensor as calibrated by the respective calibration setting.

14 Claims, 5 Drawing Sheets

(56) References Cited

U.S. PATENT DOCUMENTS

| | | | |
|---|---|---|---|
| 2007/0115440 A1* | 5/2007 | Wiklof | G03B 21/14 353/69 |
| 2008/0180553 A1 | 7/2008 | Hassan-Shafique et al. | |
| 2010/0264833 A1 | 10/2010 | Van Endert et al. | |
| 2011/0156596 A1 | 6/2011 | Salsbury | |
| 2011/0221350 A1 | 9/2011 | Staab | |
| 2011/0242293 A1* | 10/2011 | Kikuchi | G02B 27/2264 348/51 |
| 2012/0206050 A1* | 8/2012 | Spero | B60Q 1/04 315/152 |
| 2012/0235579 A1* | 9/2012 | Chemel | F21S 2/005 315/152 |
| 2013/0320862 A1* | 12/2013 | Campbell | H05B 37/02 315/152 |
| 2014/0339985 A1* | 11/2014 | Engelen | G06F 3/0421 315/151 |

* cited by examiner

CALIBRATING A LIGHT SENSOR

CROSS-REFERENCE TO PRIOR APPLICATIONS

This application is the U.S. National Phase application under 35 U.S.C. §371 of International Application No. PCT/IB2013/058477, filed on Sep. 12, 2013, which claims the benefit of U.S. Provisional Patent Application No. 61/712,386, filed on Oct. 11, 2012. These applications are hereby incorporated by reference herein.

FIELD OF THE INVENTION

The present invention relates to the calibration of a light sensor, for use in controlling the level of light in a room or other space.

BACKGROUND

Daylight harvesting refers to the use of natural daylight to supplement the artificial light in an environment such as an interior space of a building, e.g. an office or other room. The idea can be used to reduce the amount of artificial light needed to illuminate the space and so reduce energy consumption. Nonetheless, in certain environments such as an office workspace a certain standardized or recommend light level may be required, e.g. 500 Lux at desk height. Even in non-regulated environments the end-user may require a certain light level as matter of preference. Hence to conserve energy consumption whilst still meeting the relevant light level requirement, a modern lighting system may comprise a controller which adjusts the artificial light output by one or more electric lighting devices depending on the amount of daylight present.

A closed-loop control system uses feedback of the quantity it is controlling (as opposed to an open-loop system which does not use feedback). In the case of a lighting control system, a photosensor (light sensor) detects the total photometric amount of light from both daylight and electric sources in the space. The sensed level is then used to control the output of one or more electric light sources, to make up any part of the required amount of light that cannot be met using natural light alone.

Generally the output of a light sensor will need to be calibrated. This is done by mapping an observed sensor reading to a known level light in the environment, e.g. by reference to a particular plane of interest such as the workspace plane, thus determining a relationship between the sensor reading and the actual level of light to be measured. Typically this is done by a technician at the commissioning stage using a separate light meter to observe the level of light. Subsequently in operation, the calibrated relationship between sensor reading and light level can then be used to control the output of a lighting device.

For example, in closed-loop control of lighting systems, it may be required that the desired target illumination distribution can be specified. One or more light sensors are used to measure samples of the achieved illumination distribution. In such scenarios the sensor reading corresponding to the specified light level may be used as a calibration point for the light sensor, thus providing a target sensor reading which the lighting system will seek to achieve by adjusting the output of one or more lighting devices. However, for practical reasons, light sensors are often not located on the same plane as the plane where the illumination distribution needs to be rendered and is of most interest. For instance, in office lighting, light sensors are typically located on the ceiling plane, whereas the illumination of interest is that rendered over the workspace plane (e.g. desk level). As such, a calibration method is required to specify the target illuminance values to be attained at the sensors.

With the increased adoption of light emitting diodes (LEDs) in luminaires, it is possible to control the dimming and beam shapes of luminaires flexibly. This has led to a generation of future luminaires wherein multiple beams of flexible light output pattern may be created. For example see US 2010/0264833 (van Endert et al, "Continuous control of LED light beam position and focus based on selection and intensity control"). This technology can be used to design lighting systems which provide dynamic illumination patterns, driven by a desire for greater energy savings and better visual comfort.

SUMMARY

It would be desirable to provide a method of calibrating a sensor reading such that a desired illumination may be realized using a light source operable having a flexible output configuration, e.g. having a flexible output distribution such as provided by a multi-beam LED luminaire.

However, the calibration of such a system is not necessarily straightforward. For example when the distribution shape changes then not only the intensity changes, but the way in which that intensity is achieved also changes. That is, the differently shaped fields of light have a different behavior with respect to sensor reading, and so it may not necessarily be desirable to rely on a completely conventional calibration procedure.

According to one aspect of the present invention, there is provided a method of calibrating an output of a light sensor for use in controlling a lighting system comprising at least one lighting device. The method comprises placing the lighting system into each of a plurality of discrete modes, each mode being configured to output a different respective configuration of light, wherein in operation each mode will automatically vary an output illumination level of the respective configuration based on the output of the light sensor in response to a changing light level in an environment being illuminated. The method further comprises performing a plurality of calibrations by determining a respective calibration setting for calibrating the output of the light sensor in each of the modes, and setting each mode to vary the output illumination level based on the output of the light sensor as calibrated by the respective calibration setting.

The present invention thus operates in multiple lighting modes, each of those modes having a different effect on lighting conditions, but wherein each of the modes is to operate based on the output of the same light sensor. Each discrete mode emits light with a respective, identifiable configuration such as a different field shape, so that within each mode the relationship between sensor reading and light level behaves in a manner that can be parameterized by a respective calibration setting. Accordingly a different calibration setting is assigned to each mode, for calibrating the same light sensor but with a different relationship for each mode. Within each mode, the light output intensity can then be varied (potentially continuously) to control the light in the environment in a manner that is relevant to the particular light configuration of that mode, and therefore behaves predictably with respect to sensor reading despite the availability of different output configurations such as different field distribution shapes.

In embodiments, the modes comprise at least a first mode and a second mode, and the determination of the calibration settings comprises: placing the lighting system into the first mode; in the first mode, setting the lighting system to an output illumination level that is observed to achieve a first predetermined light level in the environment being illuminated, determining a level of the light sensor output corresponding to the first predetermined light level; placing the lighting system into the second mode; and in the second mode, setting the lighting system to an output illumination level that is observed to achieve a second predetermined light level in the environment being illuminated, and determining a level of the light sensor output corresponding to the second predetermined light level.

The calibrations may be performed by reference to a plane in said environment.

The first may mode provide ambient light and the second mode may provide light concentrated on a surface being illuminated, the surface being located in said plane.

The first predetermined light level may be 300 Lux at said plane and the second predetermined light level may be 500 Lux at said plane.

The calibration settings may comprise respective target levels for the output of the light sensor, the calibration comprising setting each mode so as in operation to vary the output illumination level towards the respective target level.

In preferred embodiments, said lighting device may be operable to output light with a plurality of different beam shapes, the different field shapes being the different beam shapes, and the lighting device being arranged with said plurality of discrete modes. That is, according to a preferred embodiment there is provided a method of calibrating an output of a light sensor for use in controlling a lighting device, the lighting device operable to output light with a plurality of different beam shapes. This method comprises: placing the lighting device into a plurality of discrete beam modes, each beam mode configured to output a different respective pattern of one or more of the different beam shapes, wherein each mode will automatically vary an output illumination level of the respective pattern based on the output of the light sensor in response to a changing light level in an environment being illuminated. The method further comprises performing a plurality of calibrations by determining a respective calibration setting for calibrating the output of the light sensor in each of the modes, and setting each mode to vary the output illumination level based on the output of the light sensor as calibrated by the respective calibration setting.

In further embodiments, the first mode may be configured to output a wider beam, and the second mode may be configured to output a narrower beam.

The wider beam may be a hollow beam and the narrower beam may be a non-hollow beam, wherein the first mode may be configured to output only the hollow beam, and the second mode may be configured to output both the hollow bean and the non-hollow beam. The non-hollow beam may be directed within the hollow beam.

The modes may further comprise a third mode, the third mode being configured to output only the non-hollow beam.

The lighting system may comprise a presence sensor for detecting presence of a person in a region associated with the lighting device, and the method comprises configuring the lighting device to perform one or both of: selecting between the first mode and the second mode, and varying the output illumination level of at least one of the modes, in dependence on whether presence is detected in said region.

The lighting system may comprise said lighting device and one or more other lighting devices, and said lighting device may be arranged to control said output illumination level independently of the other lighting devices.

The light sensor may be arranged to sense the light level of said environment in relation to a surface being illuminated by the lighting device, wherein the light sensor may be installed elsewhere in said environment other than on said surface, and may be directed towards said surface.

According to another aspect of the present invention, there is provided at least one lighting device; a light sensor; at least one controller arranged to operate the at least one lighting device in a plurality of discrete modes, each mode configured to output a different respective configuration of light, and each mode being configured to automatically vary an output illumination level of the respective configuration based on an output of the light sensor in response to a changing light level in an environment being illuminated; and a storage device storing a respective calibration setting for each of the modes; wherein the controller is coupled to said memory and light sensor, and configured to operate said modes based on the output of the light sensor as calibrated by the respective calibration settings.

In embodiments, the apparatus may be further configured in accordance with any of the above method features.

According to another aspect of the present invention, there is provided a computer program product for operating a lighting system comprising at least one lighting device, the computer program product comprising code embodied on a computer-readable storage medium and configured so as when executed on a processor of the lighting system to perform operations of: operating the lighting system to switch between a plurality of discrete modes, each mode configured to output a different respective configuration of light, and each mode being configured to automatically vary an output illumination level of the respective configuration based on an output of a light sensor in response to a changing light level in an environment being illuminated; retrieving a respective calibration setting for each of the modes from a storage device associated with the lighting system; and operating each of the modes based on the output of the light sensor as calibrated by the respective calibration setting retrieved from said storage device.

In embodiments the computer program product may be further configured in accordance with any of the above method or apparatus features.

BRIEF DESCRIPTION OF THE DRAWINGS

For a better understanding of the present invention and to show how it may be put into effect, reference is made by way of example to the accompanying drawings in which.

DESCRIPTION OF PREFERRED EMBODIMENTS

The following embodiments of the present invention provide an automatic calibration method for used in the configuration of a smart lighting control system. The lighting system comprises one or more controllable multi-beam luminaires and associated light sensors that together are used to render illumination distributions. Often, light sensor measurements are taken on a plane different from the plane in which the effect of the illumination distribution is of most interest. As a result, a calibration is required to set target values at such sensors so that a control algorithm may decide on appropriate dimming levels that realize those sensor target values, in turn achieving the desired illumination distribution. Known calibration methods for single beam luminaire systems cannot be applied to such sophisticated multi-beam luminaire systems since potentially infinite possibilities may exist that result in the same sensor target values. The following described embodiments provide a calibration method for setting different sensor target values using limited, different combinations of the beams, in dependence on how the beams are used at the control stage to realize the desired illumination distribution. This is advantageous in realizing improved control of lighting effects, with simplified calibration for more accurate sensor target values in closed-loop control.

Figure 1:
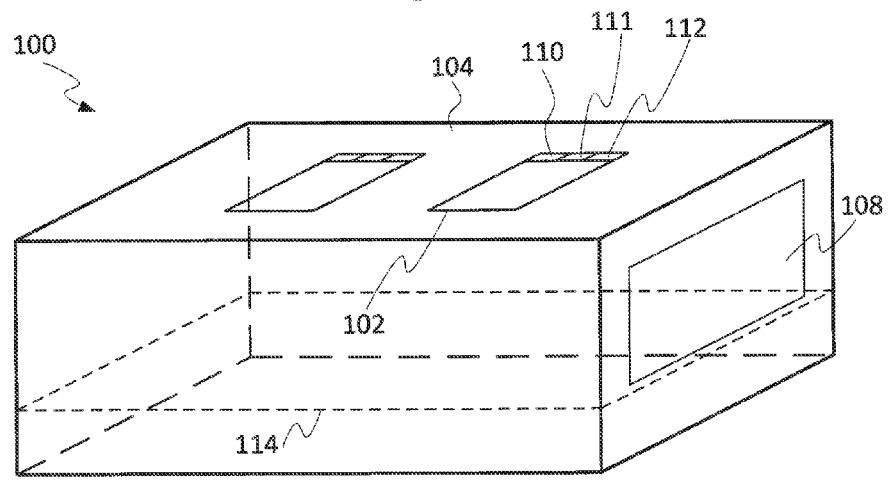
FIG. 1 is a schematic illustration of a lighting system installed in a room of a building.

FIG. 1 is a schematic representation of an environment such as an interior space of a building, e.g. an office or other room 100, installed with an example lighting system according to one embodiment of the present invention. The lighting system comprises one or more electric lighting devices 102 which may take the form of integrated fixtures of the room or free-standing units. Each lighting device 102 comprises an electric lighting element such as an LED (light emitting diode) based lighting element, along with any associated fixture or fitting. The fixture of fitting, or the device as a whole, may be referred to as a luminaire. In the example illustrated the luminaries 102 are mounted on a ceiling 104 of the room 100. Each luminaire 102 emits artificially generated light. The room 100 also comprises one or more openings such as a window 108, e.g. a window in a side wall of the room and/or a skylight. The window 108 admits other light into the room 100 from the exterior, principally natural light comprising daylight from the sun.

In the embodiment of FIG. 1, the lighting system further comprises a respective light sensor 110 and controller 112 for each of the luminaires 102. The lighting system may also comprise a respective presence sensor 111 for each luminaire 102. The controller 112 is coupled to the respective luminaire 102, and the light sensor 110 and presence sensor 111 are coupled to the controller 112. The light sensor 110 may also be substantially co-located with the respective luminaire 102 and directed to detect light from a plane being illuminated by that lighting device, e.g. being arranged to collect light reflected back up from the workspace plane 114 (e.g. from the desk). The presence sensor 111 may be located nearby the respective luminaire 102 and directed to detect presence of a person in a region illuminated by that luminaire, e.g. to sense whether a workstation is occupied.

Each controller 112 controls the output illumination level of its respective luminaire 102 based on its respective light sensor 110 and optionally also based on its respective presence sensor 111. The controller 112 may be calibrated to control the light emitted from the luminaire 102 to provide a specified target light level at a certain point or height within the room 100, such as desk height 114. I.e. the controller 112 is calibrated (e.g. by a technician at the time of installation) with the information that a certain sensed level at the detector 110 corresponds to the specified light level at the height 114 in question, so if it detects a decrease below the sensed level it will increase the light emitted by the luminaire 102 until the sensed level is back within range, and vice versa. For example one recommendation for an office workspace is 500 Lux at desk height. In this arrangement each of the controllers 112 may operate independently of one another, i.e. so each luminaire 102 is controlled independently, preferably each based on a respective light sensor 110.

Figure 2:
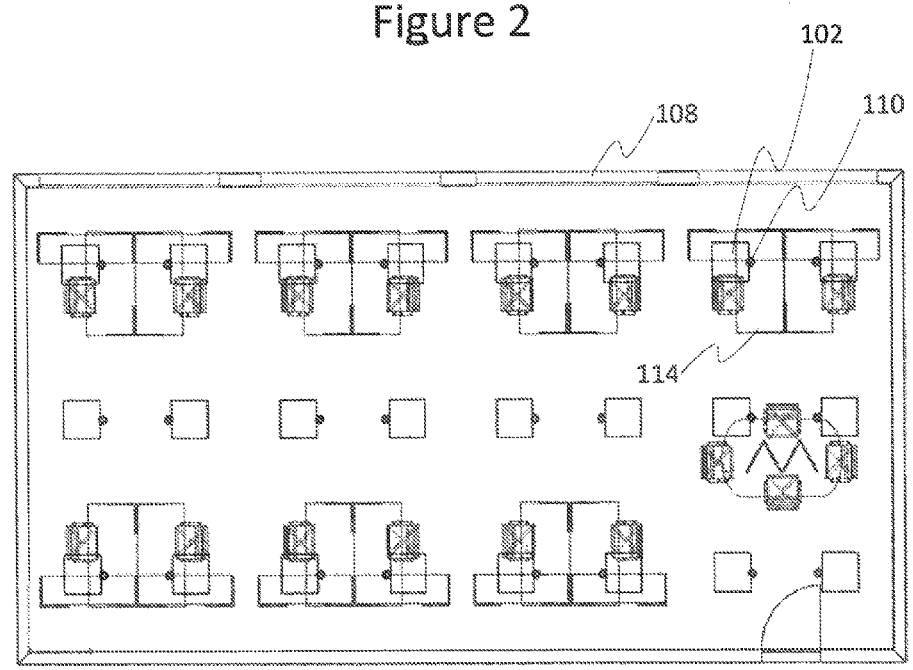
FIG. 2 is a schematic plan view of lighting system installed in a room.

FIG. 2 shows the layout of an illustrative office (plan view). The squares 102 indicate luminaires and the small black circles the position of the light sensors 110. The workspace 114 is about 1.8 m below the ceiling 104 in which the luminaires 102 and light sensors 110 are located.

Figure 3:
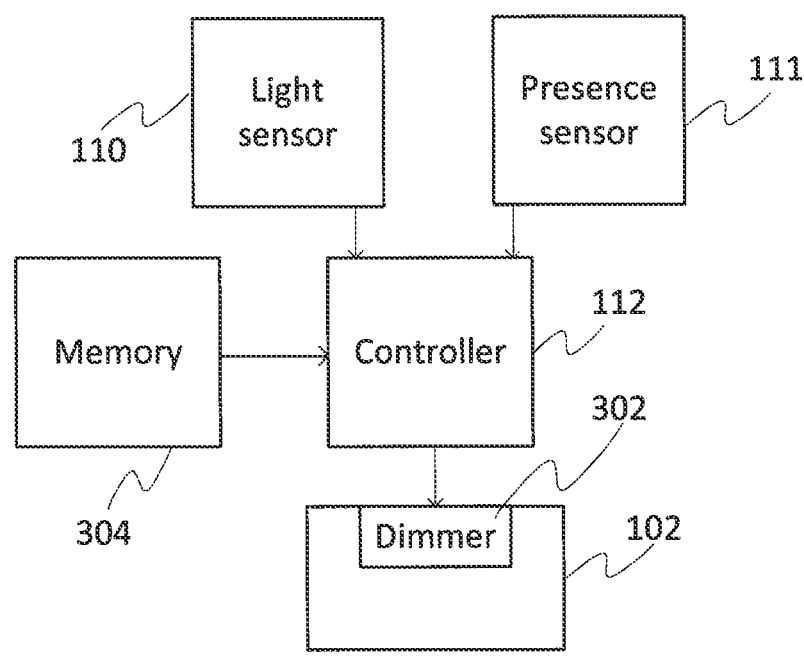
FIG. 3 is a schematic block diagram of a lighting system.

FIG. 3 is a schematic block diagram showing some of the components of FIGS. 1 and 2. The light sensor 110 is coupled to the controller 112 and arranged to supply it with an input signal that is representative of the level of light arriving at the light sensor 110. The controller 112 is coupled to the luminaire 102 and arranged to supply it with a respective control signal which controls the amount of light in the room 100 via a respective control element 302 of the device. In the case of an electric luminaire 102, the control element comprises a dimmer 302 operable to increase and decrease the amount of artificial light emitted by that luminaire 102 in dependence on the respective control signal from the controller 112.

A presence sensor 111 may also be coupled to the controller 112 and arranged to supply it with an input signal that is representative of whether a person is present in a region to be illuminated by the respective luminaire 102, e.g. based on sensing motion or infra-red activity. In this case the controller 112 is further configured to control the light output of the luminaire 102 in dependence on whether a person is sensed to be present in the relevant region, as well as on the sensed light level.

Further, the lighting system comprises a storage device 304 storing calibration settings for the luminaire 102. The storage device is a memory comprising a suitable storage medium or media such as electronic or magnetic storage. The controller is coupled to the storage device 304 and configured to retrieve the calibration settings, and control the light output of the device 102 according to the output of the light sensor 110 as calibrated using the calibration settings. As mentioned, a calibration setting may comprise a target sensor value specifying an output signal level of the light sensor 110 which the controller will seek to achieve by varying the light output intensity of the luminaire 102. The target value gives the sensor reading that is known from the calibration process (e.g. performed at the commissioning stage) to correspond to a predetermined amount of light at a particular point or level in the environment in question, e.g. 500 Lux on the desk 114.

The controller 112 itself may be implemented in the form of software stored on a storage device and arranged for execution on a processor of the lighting system, or in the form of dedicated hardware circuitry, or a combination of these. In the case of a software implementation the storage device may comprise any suitable medium or media such as magnetic or electronic storage. This may be the same storage device 304 that stores the calibration settings or a different storage device. The processor may comprise one or more processing cores or units.

Traditionally, lighting systems have been designed to provide uniform illumination due to their limited dimming capabilities and flexibility, and have been based on luminaires that produce a single fixed beam. The problem of sensor calibration in such systems is typically solved during a commissioning/installation phase as follows. The dimming levels of the luminaires are chosen such that the desired illuminance (e.g. 500 lux over the plane of interest, typically the workspace plane) is achieved, and then the corresponding sensor readings are taken as the target illuminances to be achieved during real-time control operation.

A future class of LED luminaires will be able to flexibly produce multiple light beams, taking advantage of the design flexibility that LEDs offer when integrated into luminaires. When calibrating lighting systems with such luminaires, it is non-trivial to decide how to calibrate the sensor readings since infinite combinations of dimming levels across the beams might result in the same illuminance distribution over the plane of interest. For example it can be difficult to calibrate a light sensor used to measure light in a space which is remote from it, e.g. to calibrate a ceiling-mounted light sensor used to measure light on a desk, particularly when it is necessary to take into account variations in the proportions of light from different sources.

Hence it would be desirable to provide a simple calibration method for setting sensor target values to achieve a desired illumination distribution in a lighting system with flexible multi-beam LED luminaires.

Embodiments of the present invention provide a method of calibrating a light sensor in a lighting system having different lighting modes (e.g. a mode for ambient light only, a mode for ambient light and targeted light etc.), each of those modes having a different effect on lighting conditions in an area of interest (e.g. in a workspace), by assigning respective calibration values to each of the different lighting modes whereby the calibration values reflect the manner in which the modes are used under typical operation of the lighting system.

Accordingly, referring to FIGS. 1 and 2, each luminaire 102 comprises a respective LED-based lighting element (comprising multiple LEDs), and each luminaire 102 is operable to generate light with a plurality of different output beam shapes. For example each luminaire 102 may comprise a dual-beam luminaire operable to produce two different discrete beam types.

Figure 4:
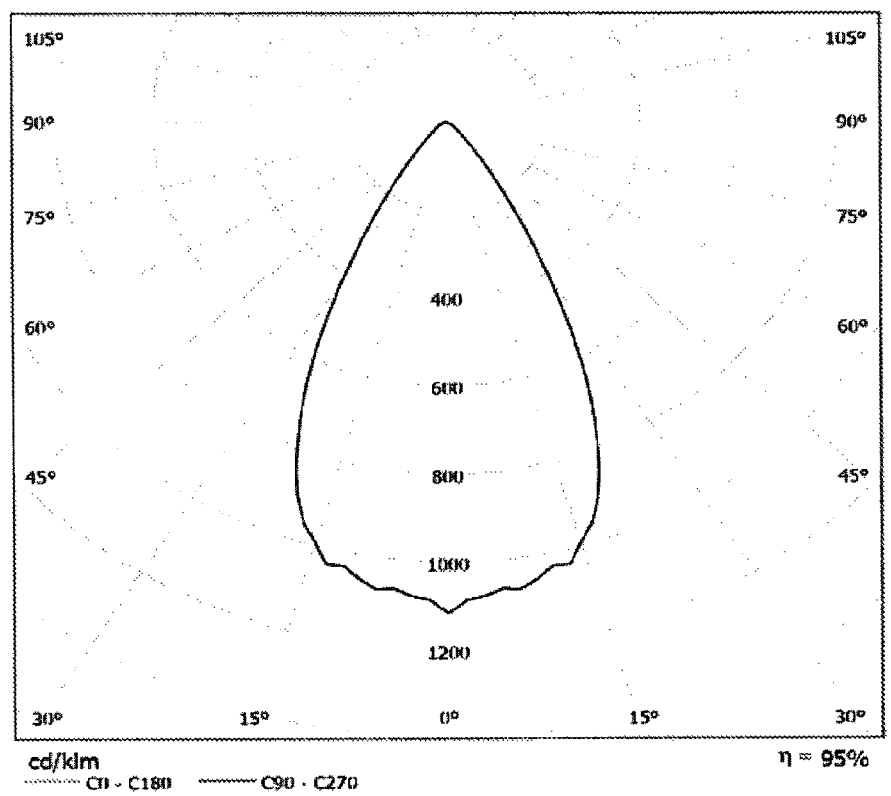
FIG. 4 shows examples of beam patterns emitted by a lighting device.
Figure 4:
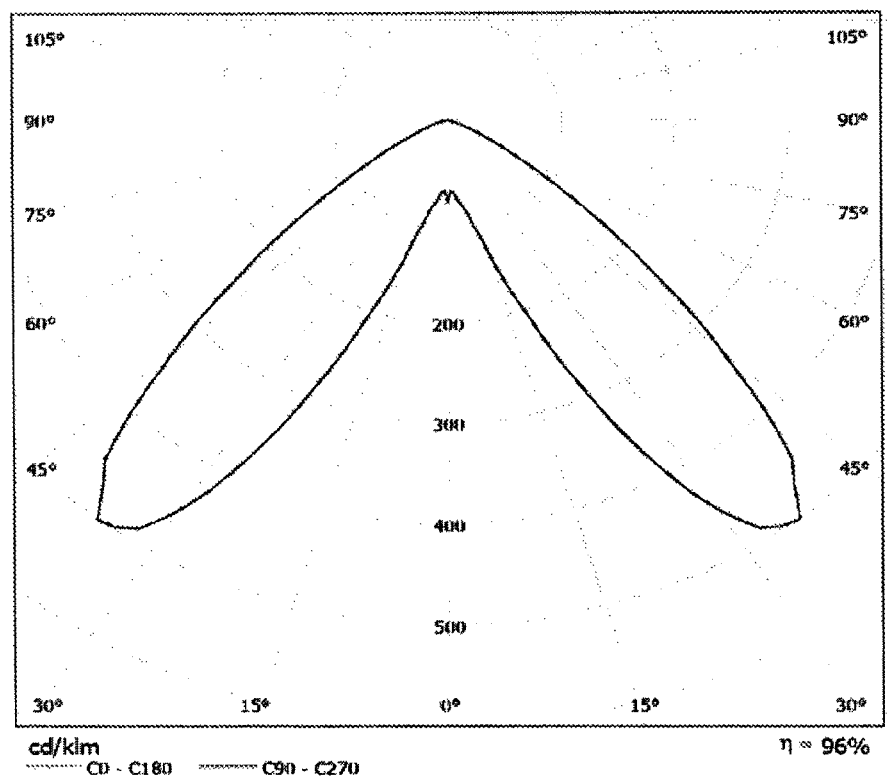

FIG. 4 shows examples of the different beam patterns produced by a dual-beam luminaire 102. In a first mode the luminaire 102 produces a hollow, wider beam (shown in the right-hand figure) for ambient light; and in a second mode the same luminaire 102 produces a narrow beam (shown in the left-hand figure) for targeted light. In embodiments the first mode may use only the hollow beam, whilst the second mode may use a combination of both the hollow and narrow beams. In such a combined mode, the narrow beam may be directed within the hollow beam, preferably parallel to it along a common axis.

The controller 112 is configured to switch the luminaire 102 between the two modes. For example this may be done based on an input from the presence sensor 111: e.g. the targeted light beam (task light) provides light that is concentrated on the workspace plane 114 (e.g. desk) and is selected when a person is detected to be present in the workspace or at the workstation in question, whereas the ambient light is selected when no person is detected to be present. Alternatively the mode could be controlled based on a manual selection from a user.

Further, within each mode, i.e. for a given beam shape, the controller 112 is configured to control the output illumination level of that beam. That is, not only does the controller 112 control the beam shape, but for a given shape it can controls the intensity of the light making up that beam (whether by explicitly specifying the intensity or controlling a variable related to intensity). Within each mode the output luminance level is controlled in dependence on the output signal level from the light sensor 110, as calibrated by a respective calibration setting. The calibration setting is stored in the relevant memory 304 and the controller 112 is configured to retrieve the setting when required.

Embodiments of the present invention provide a method for calibrating a light sensor 110 associated with such a dual-beam luminaire 102, during a calibration phase. There is also provided a method for controlling the luminaire 102 using the respective calibration values which were assigned to the different lighting modes during the calibration phase. Advantageously this provides a simple, practical and effective approach to an otherwise potentially complex calibration problem.

An illustrate example of the calibration method of the present invention is described with reference to an example luminaire that produces dual beams with profiles shown in FIG. 4. One beam has a narrow optical pattern, as depicted on the left of FIG. 4, and the other beam has a hollow optical power pattern as shown on the right of FIG. 4. Such a choice of beams is advantageous in lighting control in that the hollow beam may be used in providing an ambient light level of e.g. 300 lux when a space is partly unoccupied and using the narrow beam to provide focused task light in workspaces that are occupied.

As an example of the calibration method, consider the following desired illumination rendering: around an occupied workspace, a higher illumination level e.g. 500 lux is required, while a lower illumination level of e.g. 300 lux is to be maintained elsewhere. This illumination rendering is to be realized by controlling the combination of narrow and hollow beams of the luminaires 102. The calibration is explained with reference to the example office situation of FIGS. 1 and 2.

Figure 5:
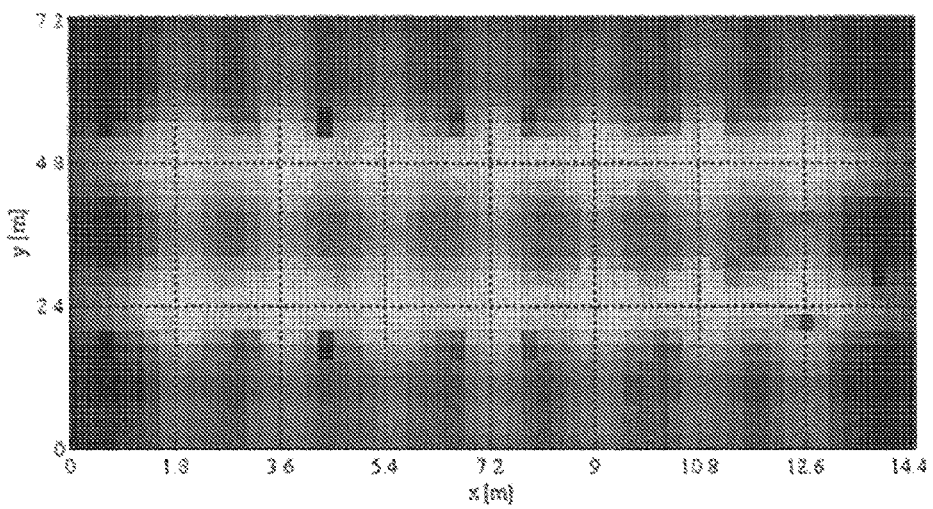
FIG. 5 shows an example lighting distribution in a horizontal plane of a room.
Figure 5:
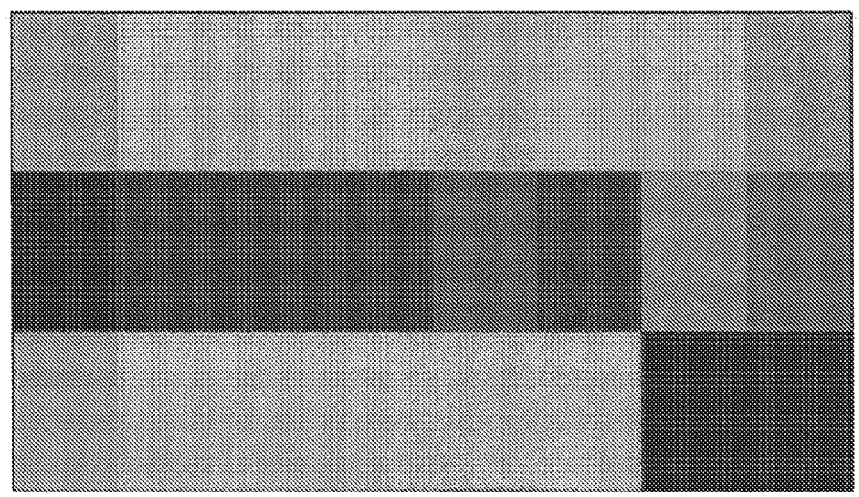

The calibration is done in two stages. In the first stage, the one or more luminaires 102 are placed into the first, hollow-beam mode, and the hollow beam of each luminaire 102 is set at a level with respect to its maximum dimming that gives q uniform level of 300 lux at the workspace plane 114 (e.g. determined by a technician with a separate light meter). In the considered example, say this setting turns out to be 1. The top of FIG. 5 illustrates an example illumination distribution in the workspace plane 114, with the lighter portions representing higher illumination and the darker portions representing less illumination. The illumination distribution on the workspace plane 114 is on average around 300 lux, within a prescribed uniformity. For this setting, the measured illuminance reading at all sensors 110 is recorded. The measured values are illustrated at the bottom of FIG. 5. Note that although the rendered illumination is uniform, the sensor readings are not. This is due to the different reflectance of objects across the sensors 110.

Figure 6:
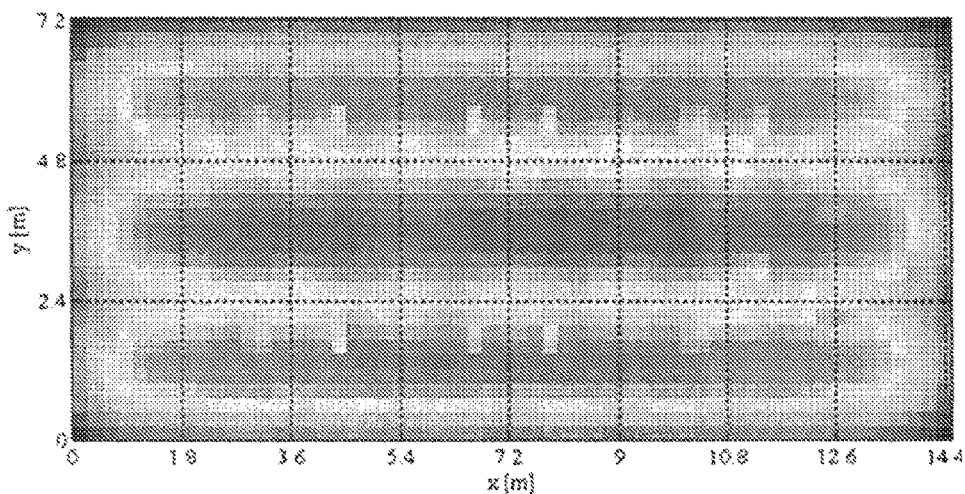
FIG. 6 shows another example lighting distribution in a horizontal plane of a room.
Figure 6:
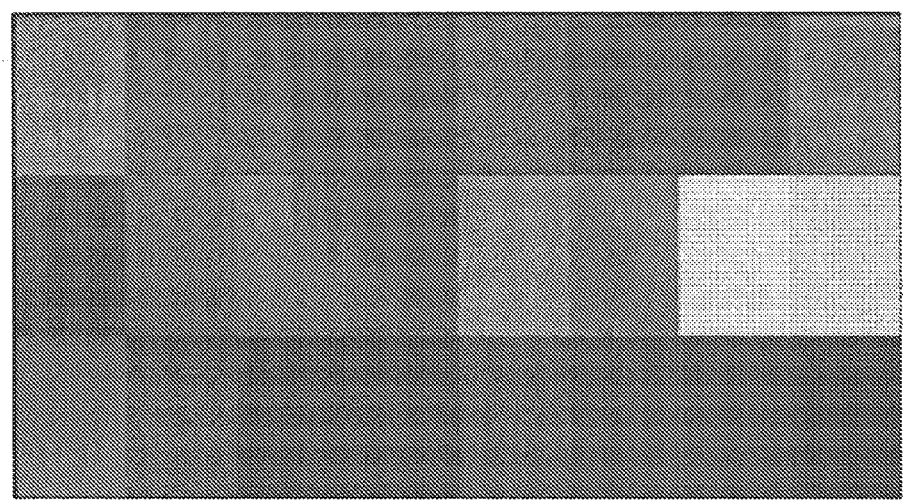

At the second stage, the one or more luminaires 102 are placed into the second, targeted beam mode, and both the hollow and narrow beams of each luminaire 102 are set at a level with respect to the maximum dimming that gives a uniform level of 500 lux. In the considered example, say this setting turns out to be 0.85 of the maximum dimming for each beam. The top of FIG. 6 illustrates an example illumination distribution in the workspace plane 114 for the second mode, with the central regions representing the highest illumination, the rings an intermediate level, and the outer, darker edges the regions with least illumination. In this case the illumination distribution on the workspace plane 114 is on average around 500 lux, within a prescribed uniformity. For this setting, the measured illuminance reading at all sensors 110 is recorded. The measured values are illustrated at the bottom of FIG. 6. Note again that although the rendered illumination is uniform, the sensor readings are not for reasons referred to earlier.

It is advantageous to use this two-part calibration method in that it is simple and tied to the way the beams are used in real-time closed-loop lighting control. In particular, the hollow beam is controlled to realize the ambient level of 300 lux and the combination of the hollow and narrow beams are used to provide the difference to attain at least 500 lux. As such, the said calibration method can provide good sensor target values for use during real-time control. These target values are stored in the memory 304 and retrieved by the controller 112 for use in controlling light level in dependence on the light sensor(s) 110.

An example real-time control method is now described to illustrate how the calibrated light sensor values may be used in relation to the control of the dual beams. As discussed, in the example lighting system, each luminaire 102 has a light sensor 110 and local controller 112. The controller 112 also has access to presence information in its local physical region (from presence sensor 111). The local controller 112 determines the dimming levels for the dual beams based on the target light sensor values from the calibration step, as stored in and retrieved from the associated memory 304. The algorithm steps implemented at the local controller 112 for controlling two independent beams are shown below.

tration and description are to be considered illustrative or exemplary and not restrictive; the invention is not limited to the disclosed embodiments.

For example, the present invention can extend to more than two beam modes. In another example there may be provided three modes: a hollow-beam only mode, a mode combining both the hollow and non-hollow beams, and a third mode using only the non-hollow beam. In this case there will be provided three respective calibration settings, e.g. three separate sensor target values, a different one for each of the modes. Generally there may be provided as many calibration settings as there are beam modes.

Further, although the above has been described in terms of multi-beam LEDs where the different light field shapes take the form of a beam, the invention may be applied to other situations where the same light sensor is to be used to control two or more different configurations of light. For example, an alternative lighting system may comprise different fluorescent or electric filament lights or different sets of such lights that can be turned on or off in different combinations. Each combination could be considered a different mode. While not providing light in the form of beam, the different combinations will nonetheless generate different light field distributions. If it is desired that, for a given combination of such lights, i.e. for each given mode, the illumination level should also be variable within that combination (e.g. con-

```
if Presence = true
    if T_{1,n} > L_n^{(k)}
        d_n^{narrow(k)} ← min(1, d_n^{narrow(k-1)} + Δd)
        if d_n^{narrow(k-1)} = 1
            d_n^{hollow(k)} ← min(1, d_n^{hollow(k-1)} + Δd)
        end
    else
        d_n^{narrow(k)} ← max(0, d_n^{narrow(k-1)} − Δd)
        d_n^{hollow(k)} ← max(0, d_n^{hollow(k-1)} − Δd)
    end
else
    d_n^{narrow(k)} ← max(0, d_n^{narrow(k-1)} − Δd)
    if T_{2,n} > L_n^{(k)}
        d_n^{hollow(k)} ← min(1, d_n^{hollow(k-1)} + Δd)
    else
        d_n^{hollow(k)} ← max(0, d_n^{hollow(k-1)} − Δd)
    end
end
```

$T_{1,n}$ : Measured level at n - th light sensor when system provides 500 lx
$T_{2,n}$ : Measured level at n - th light sensor when system provides 300 lx
$d_n^{narrow\ (k)}$ : Dimming level of narrow beam of n - th luminaire at iteration k
$d_n^{hollow\ (k)}$ : Dimming level of hollow beam of n - th luminaire at iteration k
$L_n^{(k)}$ : Measured illuminance level of n - th light sensor at iteration k Note that the target sensor values depend on the desired behavior of the lighting system and control mechanism, e.g. to render ambient illuminance of 300 lx with hollow beams or render task illuminance of 500 lx with both beams. In particular, in the second part of the algorithm, when there is no occupancy in a zone, the hollow beam may be dimmed up if the measured sensor value is below the target sensor value; and if there is sufficient daylight, then the hollow beam is dimmed down.

To summarize, the above has described a calibration method for use in closed-loop control of a lighting system with multi-beam luminaires. Calibration is done using specific combinations of the multiple beams, preferably set at a dimming level with respect to their maximum that lead to achieving certain desired illuminance values at the plane in which illumination rendering is of interest. Further, the specific combinations of the multiple beams are preferably chosen in relation to how they are used in real-time control. The resulting calibrated sensor values are then used in the real-time control stage to achieve the desired illumination rendering.

While the invention has been illustrated and described in detail in the drawings and foregoing description, such illustinuously variable for each particular combination of lights) then each combination will generally exhibit a different behavior with respect to light sensor reading. In order to be able to continuously vary the light intensity with each given combination, variants of the present invention may be applied to provide different calibration settings for each lighting combination and the different associated light distribution shapes. In other examples, the different configurations for which the present invention provides calibrations may comprise different colors of light emitted by a luminaire with a tunable color output, or even just a selection between two or more different luminaires that are to be calibrated based on the same light sensor.

The above has been described in terms of an example room, but the invention may be applied in any environment that receives light from both electric lighting and one or more other sources, e.g. any covered structure such as a gazebo, tunnel or vehicle interior, or even an illuminated open air space such e.g. at night time. Further, the term window need not only refer to windows on walls, but also for example to skylights. Also the height, region or point relative to which the target light level is set need not be limited to desk height.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of calibrating an output of a light sensor for use in controlling a lighting system comprising at least one lighting device operable to output light with a plurality of different beam shapes, the method comprising:
    placing the lighting system into each of a plurality of discrete modes, each mode being configured to output a different respective configuration of light comprising a different respective pattern of one or more of the different beam shapes, said modes being beam modes of the lighting device; and
    performing a plurality of calibrations by determining a respective calibration setting for calibrating the output of the light sensor in each of the modes, wherein in operation each mode will automatically vary an output illumination level of the respective configuration of light, in response to a changing light level in an environment being illuminated, based on the output of the light sensor as calibrated by the respective calibration setting.

2. The method of claim 1, wherein the modes comprise at least a first mode and a second mode, and the determination of the calibration settings comprises:
    placing the lighting system into the first mode;
    in the first mode, setting the lighting system to an output illumination level that is observed to achieve a first predetermined light level in the environment being illuminated, determining a level of the light sensor output corresponding to the first predetermined light level;
    placing the lighting system into the second mode; and
    in the second mode, setting the lighting system to an output illumination level that is observed to achieve a second predetermined light level in the environment being illuminated, and determining a level of the light sensor output corresponding to the second predetermined light level.

3. The method of claim 1, wherein the calibrations are performed by reference to a plane in said environment.

4. The method of claim 2, wherein the first mode provides ambient light and the second mode provides light concentrated on a surface being illuminated, the surface being located in said plane.

5. The method of claim 2, wherein the first predetermined light level is 300 Lux at said plane and the second predetermined light level is 500 Lux at said plane.

6. The method of claim 1, wherein the calibration settings comprise respective target levels for the output of the light sensor, the calibration comprising setting each mode so as in operation to vary the output illumination level towards the respective target level.

7. The method of claim 1, wherein the modes comprise at least a first mode and a second mode, the first mode being configured to output a wider beam, and the second mode being configured to output a narrower beam.

8. The method of claim 7, wherein the wider beam is a hollow beam and the narrower beam is a non-hollow beam, the first mode being configured to output only the hollow beam, and the second mode being configured to output both the hollow bean and the non-hollow beam, the non-hollow beam being directed within the hollow beam.

9. The method of claim 8, wherein the modes further comprises a third mode, the third mode being configured to output only the non-hollow beam.

10. The method of claim 1, wherein the lighting system comprises a presence sensor for detecting presence of a person in a region associated with the lighting device, and the method comprises configuring the lighting device to perform one or both of:
    selecting between the first mode and the second mode, and
    varying the output illumination level of at least one of the modes, in dependence on whether presence is detected in said region.

11. The method of claim 1, wherein the lighting system comprises said lighting device and one or more other lighting devices, and wherein said lighting device is arranged to control said output illumination level independently of the other lighting devices.

12. The method of claim 1, wherein the light sensor is arranged to sense the light level of said environment in relation to a surface being illuminated by the lighting device, the light sensor being installed elsewhere in said environment other than on said surface, and being directed towards said surface.

13. Apparatus comprising:
    at least one lighting device operable to output light with a plurality of different beam shapes;
    a light sensor;
    at least one controller arranged to operate the at least one lighting device in a plurality of discrete modes, each mode configured to output a different respective configuration of light comprising a different respective pattern of one or more of the different beam shapes, said modes being beam modes of the lighting device, and each mode being configured to automatically vary an output illumination level of the respective configuration based on an output of the light sensor in response to a changing light level in an environment being illuminated; and
    a storage device storing a respective calibration setting for each of the modes;
    wherein the controller is coupled to said memory and light sensor, and configured to operate said modes based on the output of the light sensor as calibrated by the respective calibration settings.

14. A computer program product for operating a lighting system comprising at least one lighting device operable to output light with a plurality of different beam shapes, the computer program product comprising code embodied on a computer-readable storage medium and configured so as when executed on a processor of the lighting system to perform operations of:
    operating the lighting system to switch between a plurality of discrete modes, each mode configured to output a different respective configuration of light comprising a different respective pattern of one or more of the different beam shapes, said modes being beam modes of the lighting device, and each mode being configured to automatically vary an output illumination level of the respective configuration based on an output of a light sensor in response to a changing light level in an environment being illuminated;

retrieving a respective calibration setting for each of the modes from a storage device associated with the lighting system; and operating each of the modes based on the output of the light sensor as calibrated by the respective calibration setting retrieved from said storage device.

* * * * *